United States Patent [19]
Haynes et al.

[11] Patent Number: 5,089,278
[45] Date of Patent: Feb. 18, 1992

[54] MICROWAVE BROWNING COMPOSITION

[75] Inventors: Lynn C. Haynes; Harry Levine, both of Morris Plains; Michael S. Otterburn, Randolph; Paul Mathewson, Whippany, all of N.J.

[73] Assignee: Nabisco Brands, Inc., East Hanover, N.J.

[21] Appl. No.: 360,582

[22] Filed: Jun. 2, 1989

[51] Int. Cl.$^5$ .............................................. A23L 1/272
[52] U.S. Cl. ........................................ 426/98; 426/89; 426/96; 426/243; 426/262; 426/302; 426/305
[58] Field of Search ..................... 426/89, 96, 98, 99, 426/243, 262, 302, 305

[56] References Cited

U.S. PATENT DOCUMENTS

| | | | |
|---|---|---|---|
| 4,144,357 | 3/1979 | Mohammed | 426/96 |
| 4,252,832 | 2/1981 | Moody | 426/241 |
| 4,448,791 | 5/1984 | Fulde et al. | 426/94 |
| 4,518,618 | 5/1985 | Hsia et al. | 426/262 |
| 4,640,837 | 2/1987 | Coleman et al. | 426/94 |
| 4,801,459 | 1/1989 | Liburdy | 424/450 |
| 4,882,184 | 11/1989 | Buckholz et al. | 426/243 |
| 4,968,522 | 11/1990 | Steinke | 426/602 |

FOREIGN PATENT DOCUMENTS 0203725 3/1986 European Pat. Off. .

OTHER PUBLICATIONS

"Encapsulation and stimulated release of enzymes", International Journal of Food Science and Technology (1987) vol. 22, pp. 707–723.
"Accelerated ripening of cheese using liposome-encapsulated enzyme", International Journal of Food Science and Technology 1987, vol. 22, pp. 355–375.
"Browning Methods in Microwave Cooking", Agricultural and Food Chemistry, May 1955, pp. 424–427.

*Primary Examiner*—Donald E. Czaja
*Assistant Examiner*—Evan Federman

[57] ABSTRACT

A heat- or microwave-activated browning composition is prepared for coating a food product to produce surface browning on exposure to heat or microwave energy. A method of browning a food product includes the steps of coating a food product with a microwaveable browning composition and subjecting the coated product to heat or microwave energy. The microwaveable browning composition includes at least one liposome-encapsulated Maillard browning reagent. A basic amino acid is encapsulated in the aqueous interior of the liposome. A reducing sugar is dissolved in the external aqueous phase of the liposome. The external aqueous phase may also contain a film-forming material. The Maillard browning reaction is triggered by heat or microwave energy. This heat or microwave energy causes the liposomes to rupture, releasing amino acid to react with reducing sugar, producing Maillard browning products. If a basic amino acid is used, the reaction is further catalyzed by a rise in pH of the external aqueous phase upon release of the amino acid from the liposome. Furthermore, phospholipids (from which the liposome vesicles are made) can enhance the extent and rate of Maillard browning product formation.

65 Claims, 1 Drawing Sheet

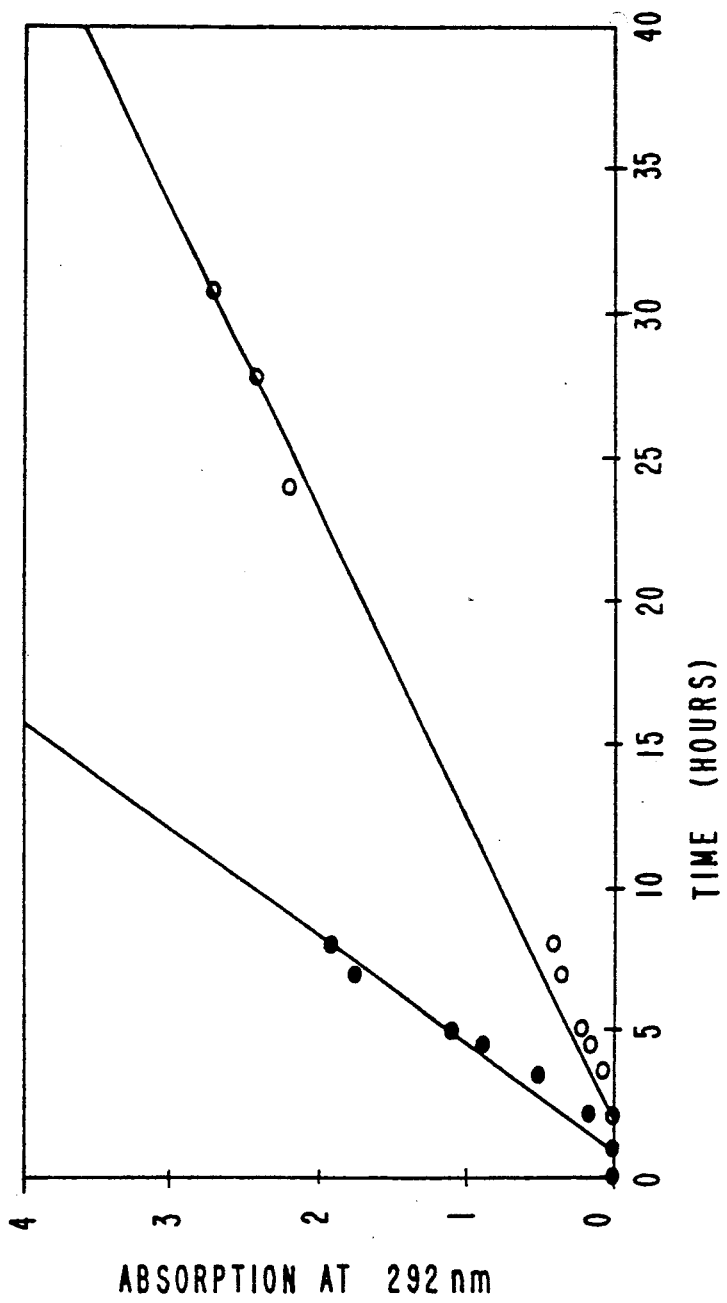

MICROWAVE BROWNING COMPOSITION

FIELD OF THE INVENTION

The present invention is directed to a microwave-activated browning composition including at least one liposome-encapsulated Maillard browning reactant or pH-adjusting agent. More particularly, the invention is directed to a substantially colorless browning composition that is activated by microwave energy to release the previously encapsulated Maillard reactant and produce the brown coloring and taste typical of foods cooked or baked in a convection oven. The browning composition is stable for extended periods of time at ambient temperatures, without the browning reaction occurring prematurely. The composition can further be applied as a thin, colorless film to prepared foods.

BACKGROUND OF THE INVENTION

In recent years, the popularity of microwave ovens in the household has increased dramatically. This popularity is due, in part, to the ease and speed of microwave cooking of many foods, compared to conventional cooking. As the number of households having microwave ovens increases, the demand for suitable packaged and prepared foods adapted for microwave use also increases. Microwave cooking of some types of foods has experienced some consumer resistance and dissatisfaction. The characteristics and nature of microwave cooking are substantially different from conventional convection heating, and therefore some foods do not cook well in the microwave oven. One of the more notable disadvantages of microwave cooking is the inability to produce the highly desirable brown color on the surface of the food. The brown color is particularly desirable on meats, breads and pastries. Microwave cooking does not raise the surface temperature of the food to a high enough temperature, for a period of time long enough, to brown the food.

Efforts have been made to compensate for this lack of natural browning in the microwave, by either partially cooking the food in a conventional oven or by applying various sauces and other coatings which absorb or concentrate the microwaves. These coatings have met with only limited success in producing the desired browning of meats. These methods have also not proved to be particularly successful in microwave cooking of breads or pastries. These products require a brown surface to make the product acceptable to the consumer. Although they may be effectively cooked in the microwave, their bland appearance makes them undesirable to the consumer. The browning of foods has been the subject of much research for many years and is still not completely understood. The browning reaction of foods is commonly referred to as the "Maillard Reaction." The Maillard reaction or browning reaction can be defined generally as the action of amino acids and proteins on sugars. The carbohydrate must be a reducing sugar, because a free carbonyl group is necessary for such a chemical condensation reaction. The reaction proceeds with the eventual formation of melanoidins, which are brown-colored nitrogenous polymers and copolymers. The rate and extent of the browning reaction is influenced by a number of factors, including the particular amino acid or protein, the carbohydrate, and the presence of lipid. Different foods react at different rates and do not brown to the same extent. Foods rich in reducing sugars are usually very reactive, while foods having low concentrations of reducing sugars do not brown as fast or as much. Other factors which affect the browning reaction include temperature, pH, moisture level, oxygen, metals, phosphates, and sulfur dioxide.

In the Maillard reaction, the basic amino group is consumed, and so the initial pH of the system has an important effect on the rate of the reaction. The reaction slows down as the pH decreases, and therefore the reaction tends to be self-inhibitory as it proceeds. To maintain proper pH, a buffer can be added to the system. The pH of the food is dependent in part on the concentration of the amino acid and the amount of moisture in the food. When a large amount of water is present, most of the browning occurs by caramelization of sugars. At lower water levels and at pH levels greater than about 6, the Maillard reaction is the predominant cause of browning.

The previous efforts to overcome the inability of foods to brown during microwave cooking or heating are not completely effective in achieving a pleasing brown color in the microwave oven. In addition, these compositions are not particularly stable for extended periods of time, and this instability typically results in premature browning during storage. There is, therefore, a need for a browning composition that is shelf-stable and can be activated by microwave energy to produce the distinctive brown color and flavor associated with conventional cooking. The present invention is directed to such a browning composition.

The browning composition, according to the present invention, includes the reactants, essential to produce the Maillard reaction during heating, in a form that is stable at room temperature for extended periods of time. The stability of the browning composition is achieved by preparing a composition containing a film-forming component, a reducing sugar, and a liposome-encapsulated base or basic amino acid, the latter at a pH higher than the pKa of the alpha amino group. Therefore, the amino acid is maintained in its most reactive state, but is physically separated from, and thereby inhibited from direct contact with, the reducing sugar prior to release from the liposome. Nucleophilic condensation of amino acid and sugar aldehyde is facilitated when the liposomes rupture upon exposure to microwave energy, thus releasing the amino acid and allowing it to come into direct contact with the reducing sugar located outside the liposomes.

Liposomes are essentially closed lipid bilayer membranes in the form of vesicles or sacs containing an internal aqueous core. The liposomes are formed from an aqueous component and a polar lipid. The phospholipids are the common lipids used in preparing typical liposomes. The polar lipid forms a membrane by orienting its polar hydrophilic end toward the aqueous phase and orienting its non-polar end toward the center of the liposome bilayer. The structure of the liposome provides a unique carrier for water-soluble components entrapped in the aqueous core, which cannot otherwise be readily segregated in an aqueous medium.

Liposomes can be prepared by a number of known methods. Depending on the method employed, the liposomes formed can be either unilamellar vesicles, having a single lipid bilayer membrane, or multilamellar vesicles, having a number of concentric lipid bilayers. The multilamellar liposomes are generally the preferred form in most commercial applications, because multilamellar liposomes are able to encapsulate larger amounts of materials and are able to encapsulate larger molecules, including macromolecules.

In one of the early methods of preparing liposomes, a phospholipid, such as phosphatidylcholine, is suspended in an organic solvent which is then evaporated to dryness, resulting in a waxy phospholipid film on the wall of the vessel. An aqueous solution of the material to be encapsulated is added to the vessel and agitated to produce a dispersion of unilamellar liposomes.

Efforts to increase the volume of entrapped materials in liposomes have resulted in the formation of inverse micelles or liposome precursors. The precursors or vesicles contain an aqueous phase surrounded by a monolayer of lipid molecules oriented so that the polar heads are directed toward the aqueous phase. The liposome precursors are formed by sonicating a mixture of an aqueous solution and an amphiphilic lipid dissolved in an organic solvent. The water and the organic solvent are then evaporated in the presence of excess lipid. The resulting liposomes are then redispersed in an aqueous medium.

The physical characteristics of liposomes can be improved by including various additives in the lipid bilayer. For example, the permeability of the lipid bilayer membrane can be reduced by including a minor amount of cholesterol with the amphiphilic lipid, in order to enhance the orientation of the lipid and produce a more orderly array. The ordered arrangement of the molecules stabilizes the bilayer and reduces permeation of the encapsulated material.

An important physical property of liposomes, which is utilized in the heat-triggered, controlled release of Maillard browning reagents in the present invention, is the phase transition temperature of the membrane. Each type of phospholipid has its own characteristic phase transition temperature. At temperatures below the phase transition temperature, the lipid membrane is in a highly ordered, crystalline array. At temperatures above the phase transition temperature, the lipid melts, causing the membrane to rupture and the encapsulated ingredients to be instantaneously released.

Liposomes are generally stable structures, relatively simple to produce, and can be dispersed in most aqueous solutions. Liposome dispersions offer a convenient vehicle for delivering a component that cannot otherwise be easily dispersed in an aqueous solution. In addition, the structure of liposomes provides a means of protecting and isolating a component from the external environment, until the liposomes rupture.

The most common use of liposomes has been in the pharmaceutical field to deliver drugs to a specific site. To a lesser extent, liposomes have also been used in the food industry to introduce a particular component to a food composition during processing. An example of such applications in the food industry is the use of liposomes to encapsulate an enzyme in the aqueous layer, and the introduction of the liposomes during the cheesemaking process to accelerate the ripening of cheese. Encapsulating the enzyme inside the liposome stabilizes the enzyme, such that it remains active longer during the process.

There is a need for a browning composition that is shelf-stable for an extended period of time and that does not undergo premature browning during storage. There is further a need for a microwaveable browning composition that can be applied as a thin, colorless coating to the surface of foods and that will remain adhered to the surface of the food during cooking or heating. The present invention is directed to a microwaveable composition that overcomes the limitations of the previous efforts to produce a browning composition suitable for microwave use.

SUMMARY OF THE INVENTION

The disadvantages and limitations of the prior art are obviated by the present invention, which provides an effective microwave browning agent that can be directly applied as a coating to prepared foods. The present invention is directed to a stable composition that does not undergo premature browning during storage and that is readily activated by microwave energy to produce a golden brown color on the surface of a food. The browning composition of the invention is prepared in an aqueous solution and includes an optional film-forming agent and the essential reactants for the Maillard reaction, namely, a reducing sugar and an amino acid. A suitable buffer, such as sodium bicarbonate, is provided in amounts less than about 0.6% by weight of the browning composition, so as not to affect the stability and leavening of food products such as doughs. Premature browning is substantially prevented by encapsulating at least one of the essential reactants in the aqueous core of liposomes. The composition is stabilized, in that the reactant is encapsulated in the liposome and physically isolated from the other reactants. A pH-adjusting component may alternatively be encapsulated, such that the pH of the system is below the reaction point until the liposomes rupture by the application of heat or microwave energy.

When the browning composition is subjected to heat or microwave energy, the liposomes rupture, thereby releasing the amino acid or other pH-adjusting agent, raising the pH of the system, and promoting the browning reaction. Other water-soluble Maillard browning reagents can alternatively be sequestered inside the liposomes. For example, glucose can be encapsulated, while the amino acids or proteins can be part of the external aqueous environment. In addition to the encapsulation of the amino acid inside the liposome, a base or other pH adjusting agent may also be encapsulated in an amount sufficient to adjust the pH of the browning composition to a point such that the Maillard browning reaction occurs.

In one embodiment of the invention, the browning composition is made from chitosan in solution with a reducing sugar. The use of chitosan is advantageous, because it is a good film-forming material and contains primary amino groups that participate in the Maillard browning reaction. A basic amino acid such as lysine or histidine is preferred for encapsulation in the liposomes and to initiate the reaction when the composition is subjected to microwave energy. It has been demonstrated that the basic amino acid, upon release from the liposomes, will raise the pH of the external medium. Thus, the liposomes are added directly to the chitosan solution in an amount sufficient to raise the pH of the composition (after liposome rupture) to approximately the pKa of the amino group of the chitosan.

This browning composition is applied to the outer surface of a food product to form a thin and continuous film. The pH of the browning composition is maintained below the point at which the Maillard reaction occurs, until activated by microwave energy. When exposed to microwave energy, the liposomes rupture and release the amino acid, thereby raising the pH of the system to about the pKa of the chitosan. The heat generated from the microwave energy, in combination with the rise in pH, promotes the Maillard reaction between the chitosan and the reducing sugar. The use of phospholipid as an encapsulation matrix further enhances the extent and rate of formation of Maillard reaction products.

Other embodiments of the invention employ other film-forming materials in place of chitosan. A film-forming material is particularly advantageous in the browning composition, because it serves as a carrier for the reactants and adheres well to the food during storage and microwave heating. The film-forming materials found to be suitable include collagen, gelatin, and vegetable gums such as alginate and guar gum. Browning compositions are prepared by suspending the film-forming component in an aqueous dispersion containing a reducing sugar and a reactive amino acid. If necessary, the pH of the external solution can be adjusted up or down by the addition of a suitable buffer, such as acetate or carbonate. A liposome preparation encapsulating a basic amino acid is then added and uniformly dispersed throughout the solution in amounts such that the pH rises upon release of the Maillard reagent. The liquid browning composition can be reduced to a powder form or applied directly to a food product by spraying or dipping to produce a substantially continuous film. When subjected to microwave energy, the liposomes rupture to release the Maillard reagent and, in the case of a basic amino acid, raise the pH to the point at which the browning reaction proceeds. The amount of the liposome-encapsulated, basic amino acid employed will depend on the reactive amino acid, the reducing sugar, and the pH of the composition before the liposomes are added.

When the film-forming component is chitosan, the pH of the browning composition prepared according to the invention must be adjusted to a pH greater than about 6.0 to promote Maillard browning. Lysine requires a pH greater than about 8.5 to react with a reducing sugar and to promote Maillard browning. Also, heat energy is necessary for the Maillard reaction to occur at a significant rate. Premature browning during storage is substantially eliminated by sequestering at least one of the Maillard reagents, usually a basic amino acid, inside the liposome vesicles. The browning composition is activated by microwave energy, which ruptures the liposomes and releases the reactant. If the pH of the system is not already pH $\geq 8.0$, release of appropriate amounts of basic amino acid will increase the pH to the proper level.

The preferred base is a basic alpha amino acid, such as arginine, hydroxylysine, histidine or lysine. Inorganic bases such as sodium phosphate, sodium carbonate and sodium bicarbonate can also be used. Some other inorganic bases tend to diffuse from the liposome into the external medium of the browning composition and cause premature browning. Therefore, care must be exercised to select a base that does not readily diffuse through the vesicle walls of the liposomes.

BRIEF DESCRIPTION OF THE DRAWINGS

FIG. 1 is a graph of the rate of color formation of unencapsulated and encapsulated reactants in accordance with the present invention.

DETAILED DESCRIPTION OF THE INVENTION

The present invention is directed to a stable, liposome-encapsulated Maillard browning composition and to a method of browning foods in a microwave oven. More particularly, the invention is directed to a film-forming composition that can be evenly applied to the outer surface of a food product to produce a uniform, golden brown color when cooked or heated in a household microwave oven. The browning composition is shelf-stable for extended periods of time and is able to withstand the environmental temperature changes that typically occur in shipping and processing of commercial shelf-stored products. The compositions of the present invention find particular use in dough-based products intended to be cooked or heated in a microwave oven by the consumer. The compositions are particularly suitable for partially cooked dough-based products that are to be reheated in a microwave oven by the consumer to finish cooking the product and brown the surface. Examples of this type of product include cookies, crackers, cakes, pie crusts, biscuits, muffins, rolls, pastries, breads, brownies, and snack foods. The browning composition is also suitable for browning meat, poultry, and other foods that do not typically brown during microwave cooking or heating.

The essential reactive components of the browning composition of the present invention are an amino acid source and a reducing sugar. The heat generated from the microwave energy causes the reducing sugar and the amino acid in the surface coating to chemically react and produce a browning effect. This browning reaction creates the appearance of the food product having been baked in a standard convection oven. The rate and extent of browning is dependent on a number of factors, including cooking temperature, cooking time, pH, concentration of the reactants, moisture content of the substrate and its relative vapor pressure, and the presence of phospholipid.

The browning composition of the invention includes a reducing sugar, a source of an amino acid, a phospholipid, and an optional film-forming component. In one embodiment of the invention, a liposome-encapsulated base is combined with the composition in an effective amount such that when the liposomes rupture during microwave heating, the pH of the composition will rise to the point where the Maillard reaction occurs between the reducing sugar and the amino acid of the composition. In another embodiment, at least one of the reactants essential to Maillard browning is encapsulated in the liposomes. Heating the composition ruptures the liposomes, thereby releasing the encapsulated reactant and allowing the Maillard reactants to interact.

The Maillard reaction involves the reaction between a reducing sugar and a primary amino group from an amino acid, peptide, protein, or protein hydrolyzate. The reaction proceeds through a series of complicated rearrangements to form the brown nitrogenous polymers or melanoidins. One of the factors that determine the rate of the reaction is the pH of the composition. The critical pH required for the Maillard reaction to occur rapidly has been found to be approximately equal to the pKa of the primary amino group of the amino acid. It has been found that the minimum pH, for the browning of chitosan to occur, is about pH 6.

The browning composition of the present invention physically isolates, via encapsulation in liposomes, either (a) one of the participating Maillard reactants or (b) a pH-adjusting agent. Encapsulating one of the participating reactants prevents reaction, until the liposomes rupture during microwave heating to release the encapsulated reactant. The pH of the browning composition may be adjusted to the point at which the Maillard browning reaction will proceed when the liposomes release the encapsulated reactant. The browning composition may have a pH between about 4 and about 10 before the rupture of the liposomes and alternatively a pH between 4 and 6. The liposome may also encapsulate a base, suitable to adjust the pH of the system upon rupture of the liposomes. The pH adjusting agent may be present in an amount to adjust the pH of the composition to between 6.2 and about 7.2 upon rupture of the liposomes.

The browning composition may also be prepared from an amino acid source and a reducing sugar, wherein the composition is maintained below the pH where the Maillard reaction proceeds. The encapsulant, in the aqueous core of the liposomes, is a suitable pH-adjusting agent capable of raising the pH of the system to promote Maillard browning when the liposomes are ruptured during microwave heating. The pH-adjusting agent is typically a basic amino acid that will also participate in Maillard browning. As long as the liposomes remain intact, the pH-adjusting agent is isolated from the rest of the system, and the pH of the browning composition is below the required pH for Maillard browning. In the preferred embodiment of the invention, the pH-adjusting encapsulant is provided in an amount sufficient to adjust the pH of the browning composition to within about pKa +0.2 to about pKa +1, where pKa is the pKa of the primary amino group of the amino acid source. By adjusting the pH of the system within this range, one ensures that Maillard browning proceeds at an optimum rate. The pH of the external phase surrounding the liposomes may be adjusted by a suitable buffer, such as an acetate or carbonate buffer system. When the liposomes are ruptured and the pH of the composition is raised to about pKa +1, about 99.9% of the available amino groups are deprotonated, and therefore the composition will brown under the heat generated by microwave energy.

The optional film-forming material may be any food-compatible material that is able to be dissolved or dispersed in an aqueous solution and that can be applied to a food product to form a substantially continuous, uninterrupted film. Suitable browning compositions may be prepared without the use of a film-forming component. The preferred film-forming materials are essentially colorless, odorless, and tasteless. Suitable film-forming materials include polymeric materials, such as chitosan, hydrolyzed collagen, gelatin, starches, and vegetable gums. The vegetable gums that have suitable film-forming properties include guar, locust bean, psyllium, tamarind, agar, alginate, carrageenan, and furcellarins. Cellulose gums, including microcrystalline cellulose, carboxymethylcellulose, methylethylcellulose, and hydroxypropylcellulose, also have good film-forming properties. Alternatively, synthetic gums may be employed, such as polyvinyl pyrrolidone and ethylene oxide polymers. The film-forming material can further be selected from the readily available natural starches, cross-linked starches, or pre-gelatinized starches. Suitable starches include wheat, corn, barley, rye, potato, and pea starch.

The preferred film-forming material is chitosan, because it is relatively inexpensive and readily available. Chitosan is a glucosamine polysaccharide from the deacetylated derivative of chitin. Chitin is the structural polysaccharide in crustacean shells such as from crab, lobster, shrimp, prawns, and crayfish. Chitin is also found in insect skeletons and wings and in some fungi. The primary repeat unit in the chitin polymer is 2-deoxy-2-(acetyl amino) glucose. These units are joined by beta, 1-4 glycosidic linkages into a linear polymer with a degree of polymerization of hundreds of units. Chitin has a structure somewhat similar to cellulose.

Chitin is insoluble in almost all solvents, except strong mineral acids. When chitin is treated with strong alkali at high temperature, the acetyl groups attached to the nitrogen atoms are removed to yield chitosan. Chitosan is a long-chain polymer containing a free primary amino group. Chitosan is soluble in dilute aqueous solutions of many organic acids, and forms a viscous solution. Chitosan has the particular advantage, in the present invention, of providing an excellent film-forming material that has a free amino group which, under proper conditions, can react with a reducing sugar during the Maillard browning reaction. The use of chitosan as the film-forming material eliminates the need for an added reactive amino acid.

When the optional film-forming material used in the invention is a vegetable gum, synthetic gum, cellulose derivative, or starch, an amino acid source must be included in the browning composition to react with the reducing sugar. The amino acid source can be any material with sufficient amino acid content to undergo the desired browning reaction in a microwave oven. Suitable amino acids include the commercially available amino acids, such as histidine, lysine, hydroxylysine, arginine, glycine, alanine, valine, proline, hydroxyproline, methionine, tyrosine, glutamic acid, aspartic acid, leucine, isoleucine, serine, threonine and phenylalanine. Other suitable sources of the amino acid include substituted primary amines, protein hydrolyzates, yeast, yeast extracts, and yeast derivatives such as yeast autolysates. Yeast extracts can be produced by heating yeast concentrates to promote enzymatic autolysis of the proteins to amino acids.

The reducing sugar component can be any of the known reducing sugars, such as glucose, maltose, xylose, mannose, galactose, fructose, and arabinose. The rate of browning during microwave cooking may vary depending on the particular reducing sugar and amino acid used in the browning composition. In most cases, the preferred reducing sugar is glucose. However, other sugars such as xylose can be used to enhance the degree of color formation. Modified starches, such as dialdehyde starch, can also enhance the reactivity of the system by virtue of a greater number and greater activity of the carbonyl groups. The reducing sugar may be replaced in whole or in part by such modified starches. Modified starches are generally preferred in high moisture conditions. The increased activity of the modified starch tends to promote better browning than do reducing sugars in high moisture environments.

A pH-adjusting agent, reducing sugar, or a reactive amino acid is encapsulated in the aqueous layer of liposomes. The liposomes typically are in the form of an aqueous dispersion. The liposome dispersion is combined with a solution of the other reactive components and a film-forming agent of the browning composition. The liposomes encapsulate the pH-adjusting agent or other reactant in their aqueous core and thereby provide an effective means to physically isolate the encapsulant from the other components. When the browning composition is subjected to microwave energy, the lipoliposomes rupture to release the pH-adjusting agent or other reactive agents (i.e., amino acid, sugar dialdehyde), and the browning reaction proceeds quickly.

The pH-adjusting agent is typically a basic component capable of adjusting the pH of the browning system to a point such that the Maillard reaction proceeds. The preferred basic encapsulant is a basic amino acid such as histidine, hydroxylysine, lysine, or arginine. Other basic components may include sodium bicarbonate, sodium phosphate, and sodium carbonate. The pH-adjusting agent typically makes up about 0.5% to about 15% by weight of the liposome, excluding the external water.

The liposomes employed in the present invention are suitably prepared according to conventional procedures. The typical method of preparing the liposomes is by reverse-phase evaporation as disclosed in U.S. Pat. No. 4,235,871, which is hereby incorporated by reference, and "Procedure for Preparation of Liposomes with Large Internal Aqueous Space and High Capture By Reverse-Phase Evaporation" *Proc. Nat'l. Acad. Sci.* Vol. 75, pp. 4194-4198 (1978).

According to this method, a polar lipid is first dissolved in an organic solvent. The solvent is then evaporated under vacuum to produce a lipid film on the wall of the vessel. The lipid is again dissolved in an organic solvent, and this is followed by the addition of an aqueous medium. The mixture is then mixed by homogenization or sonication to produce a liposome dispersion. The dispersion is placed in a rotary evaporator to remove excess water and residual organic solvent. Liposomes prepared by this method are stable for extended periods of time at ambient temperatures and can be stored without excessive premature rupture.

The liposomes, according to the invention, are suitably prepared from one or more of the phospholipids of choline, although other phospholipids can be used successfully. The preferred phospholipids of choline include egg phosphatidylcholine, dilauryloylphosphatidylcholine, dimyristoylphosphatidylcholine, dipalmitoylphosphatidylcholine, distearoylphosphatidylcholine, 1-palmitoyl-2-myristoylphosphatidylcholine, 1-stearoyl-2-palmitoylphosphatidylcholine, 1-palmitoyl-2-stearoylphosphatidylcholine and dioleoylphosphatidylcholine.

The primary function of the phospholipid is in the formation of a microcapsule, which sequesters the Maillard reagents. Saturated phospholipids, such as dipalmitoylphosphatidyl choline, which have superior bilayer-forming capabilities are generally preferred. The presence of phospholipid also serves to enhance the rate and final extent of Maillard product formation. This secondary function of the phospholipid augments the overall efficiency of the liposome-encapsulated system of the present invention for browning applications. It is believed that the Maillard browning reaction proceeds at a rapid rate at the surface of the liposomes. The reactant encapsulated in the aqueous core of the liposome is therefore present in comparatively high localized concentrations. At the time of rupture of the liposomes, a high concentration of the encapsulated reactant is present near the surface of the liposomes, and is therefore available for reacting with the other external reactants.

The effect of phospholipid on the rate of color formation is shown in FIG. 1. Similar concentrations of Maillard reagents were reacted at 65° C., a temperature at which the liposomes are known to rupture. The liposome-encapsulated reagents were released and reacted at a rate approximately 3 times faster than the unencapsulated control system.

Additional lipidic materials can be incorporated into the lipid layer of the liposome to increase the strength of the vesicle wall and to reduce the permeability of the vesicle. Examples of such stabilizing lipids include sterols, such as cholesterol, aliphatic amides, long-chain sulfates and phosphates, dicetyl phosphate, butylated hydroxytoluene, tocopherol, retinol, and the isoprenoid compounds. The amount of the stabilizing compound used will depend on the phospholipid, the encapsulated material, and the anticipated needs for the expected environment. Generally, the stabilizing agent does not exceed a 1:1 ratio with the phospholipid.

As an alternative to cholesterol, the saturated phosphatidylcholines, having a chain length of 18 carbons, have been found to be suitable for producing stable liposomes. The liposomes prepared according to the present invention have been found to be sufficiently stable for use in the browning composition, and do not require an added stabilizer.

Synthetic phospholipids can also be employed to prepare stable liposomes. The preferred synthetic phospholipids have an altered aliphatic portion, such as hydroxyls, branched carbon chains and cycloderivatives, ethers, amides, polyunsaturated derivatives, and halogenated derivatives. The phospholipid can also have an altered hydrophobic portion containing carbohydrate, glycol, phosphate, phosphorate, quaternary amine, sulfate, sulfonate, carboxyl, amine, sulfhydryl, and imidazole groups.

The group of lipids that are useful in forming stable liposomes can further include phosphatidic acid, phosphatidylserine, phosphatidylethanolamine, spingolipids, phosphatidylglycerol, sphingomyelin, cardiolipin, glycolipids, gangliosides, cerebrosides, such as pdilauryloyl phosphatidylglycerol, dipalmitoylphosphatidylglycerol, distearoylphosphatidylglycerol, dioleoylphosphatidylglycerol, dimyristoylphosphatidic acid, dipalmitoylphosphatidic acid, dimyristoylphosphatidylethanolamine, dipalmitoylphosphatidylethanolamine, dimyristoylphosphatidylserine, dipalmitoylphosphatidylserine, dipalmitoylsphingomyelin, and distearoylsphingomyelin.

The phase transition temperature of the phospholipid forming the liposome membrane influences the physical properties of the liposomes. At temperatures below the phase transition temperature, the lipid is in the solid phase, and the lipid membrane is in a highly ordered, crystalline array. The liposomes are generally quite stable below the phase transition temperature of the lipid and provide an effective means to encapsulate and isolate reactant(s) from the surrounding medium. Above the phase transition temperature, the lipid melts and causes the liposome to rupture. The encapsulant is then released and is free to react with the other reactants in the browning composition.

The greater stability of the liposome-encapsulated Maillard browning system over that of a similar unencapsulated system at temperatures below the phase transition temperature is demonstrated in Table 1. Light reflected from partially-cooked, microwaveable cookie surfaces treated with either the liposome-encapsulated Maillard browning system or the unencapsulated Maillard browning system was quantified and expressed as a numerical L value. Lower L values represent a darker surface which reflects less light. L values can range from approximately 90 for a white, glossy surface down to approximately 20 for a dull, black surface. It was observed that the cookie coated with the unencapsulated Maillard browning system had a darker surface color after one month storage at room temperature than that of the cookie coated with the liposome-encapsulated browning system. The control was untreated.

TABLE 1

| Sample | Reflected light (L) mean of 5 measurements of 2 sets of cookies |
|---|---|
| Control (untreated) | 51 |
| Liposome-encapsulated Maillard Browning System | 49 |
| Unencapsulated Maillard Browning System | 47 |

The phase transition temperature of the phospholipid can also be considered as a factor in selecting the appropriate phospholipid for the liposome. Different food products are subjected to different temperature treatments during processing and storage, and therefore require different characteristics of the phospholipid to prevent premature rupture of the liposomes. It is important to prevent rupture of the liposomes prior to microwaving, in order to inhibit browning during storage. By selecting a phospholipid having a phase transition temperature above the processing temperature requirement, one can produce liposomes which are better able to maintain their integrity during storage. In the preferred embodiment of the invention, the lipid bilayers of the liposomes are in the solid phase at room temperature and become fluid when the temperature of the browning composition rises above the phase transition temperature of the phospholipid during microwave cooking or heating. The stability and integrity of the liposomes can be controlled by any number of procedures known to control the rupturing temperature of liposomes and, accordingly, the activation temperature of the composition. The stability of the liposome can be altered and the activation temperature lowered by selecting a phospholipid having a lower melting point.

The liposomes may also contain additional components, such as flavoring agents, preservatives, antioxidants, UV absorbers, heat-stable vitamins, and coloring agents. The additional components may be encapsulated in either the lipid layer or the aqueous core of the liposomes. The components may further be encapsulated in the same liposomes as the reactant or the pH-adjusting agent. The flavoring agents of particular interest are the spice extracts and butter-flavored components which can be applied to the surface of breads, cookies, and pastries.

The liquid browning composition, according to the invention, can be applied as a thin, uniform, continuous film on any food product that can be cooked, or partially cooked, in a microwave oven. The composition can be applied by conventional spraying, brushing, rolling, or dipping techniques, as are well known in the art. The browning composition can also be applied selectively to produce a pattern or design, which is initially colorless but turns brown when subjected to microwave energy. The browning composition is particularly suitable for products that are partially cooked or partially baked by conventional means during the manufacturing stage. The partially cooked products are typically referred to as half-products. These partially cooked products are generally intended to be cooked to completion in a microwave oven by the consumer. In this manner, the consumer is able to have a commercially prepared product that can be browned during microwave cooking or heating without the need to place the food under a broiler. In a similar fashion, a fully cooked food product can be browned by reheating the food in the microwave, and can thereby give the appearance of having been fully cooked by the consumer. Such a product is perceived as more desirable than a product that has been previously browned and is simply reheated in the microwave oven.

The browning composition is particularly suitable for meats and flour-based dough products, where a browning effect is highly desired by the consumer. Examples of dough-based food products include cookies, crackers, biscuits, cakes, pies, breads, rolls, pastries, muffins, brownies, and the like. Such dough products generally appear uncooked and unappetizing when cooked or baked in a microwave oven. The formulations of the intended food products are those conventionally used in the industry. For example, a typical pie crust may contain 30 to 60 percent by weight flour, 25 to 45 percent by weight shortening, and 15 to 25 percent by weight water. A typical cookie formulation may contain 30 to 55 percent by weight flour, 15 to 25 percent by weight sugar, 15 to 35 percent by weight shortening, 3 to 20 percent by weight water, and 5 to 30 percent by weight flavoring solids.

The relative proportions of the active ingredients in the browning composition can vary widely, depending on the nature of the product to be cooked, the film-forming component, the reducing sugar, and the amino acid source. It is essential that the reducing sugar and the reactive amino acid be present in an amount which is sufficient to produce the browning reaction. The amino acid is typically present in a ratio of from about 0.5:1 to about 1:10 of the reducing sugar. The amino acid or source of amino acid is generally present in an amount of about 10% to about 90% by weight of the optional film-forming component. The reducing sugar is generally present in an amount of about 10% to about 99% by weight of the optional film-forming agent.

One embodiment of the invention uses chitosan as the film-forming component. Chitosan has the advantage of being a glucosamine polysaccharide which is able to react with a reducing sugar to produce browning on the surface of a food product when the pH of the browning composition approaches pH 6. In addition, chitosan has good film-forming properties, and its solution can be applied by spraying, dipping, or brushing. When chitosan is used as the film-forming component, a reducing sugar is preferably used in an amount from about 0.6 to 6.0 percent by weight based on the total weight of the browning composition, including moisture. In general, the higher the sugar content and the lower the moisture content, the faster the rate of browning. The liposome-encapsulated pH-adjusting component is typically present in the browning composition in an amount of from about 0.3 to 6.0 percent by weight based on the total weight of the browning composition. Factors that determine the amount of the liposome preparation required to be added to the browning composition include the encapsulation efficiency of the pH-adjusting component in the liposome, the water contents of the coating and the food product, and the pH of the browning composition before the liposome-encapsulated base is added.

When the browning composition employs film-forming materials other than chitosan, the composition must have a suitable amino acid added in an amount sufficient to effect microwave browning. The amount of amino acid present is typically about 15 to 90 percent by weight of the film-forming agent. A reducing sugar is mixed with the film-forming component in the range of about 15 to 90 percent by weight of the amino acid.

The above examples exemplify the preferred embodiment of the invention, but it is to be recognized that other film-forming materials can also be employed. In another alternative embodiment, the reactive amino acids and/or the reducing sugars are encapsulated in the liposomes, provided both reactants are not encapsulated within the same liposome. For example, a browning composition can be made from a gelatin solution with the reducing sugar dispersed therein. The reactive amino acid is encapsulated in the liposomes, and combined with the film-forming composition. The liposome dispersion is present in the film at an amount sufficient for the encapsulated amino acid to effectively react with the reducing sugar. In this embodiment of the invention, the pH of the browning composition is adjusted to a satisfactory level to promote the browning reaction once the amino acid is released from the liposomes.

The browning composition is prepared as a viscous dispersion and can be applied directly to the surface of a food as a paste. The dispersion can be diluted with an aqueous medium for easier handling in spraying, rolling, and brushing applications. Alternatively, the composition can be dried to a powder form and applied to the surface of a food substrate as a dry coating. The browning composition can be cast into a film or sheet, although excessive handling and flexing of the sheet may cause premature rupturing of the liposome vesicles.

The preferred embodiment of the invention is primarily directed to a browning composition for use in the microwave oven. The novel compositions, according to the invention, are also applicable for use in a standard convection oven whenever an accelerated browning effect is desired. By coating the food with the browning composition, one can cause a browning reaction to occur in a shorter period of cooking time than is normally required in conventional oven cooking. This is particularly suitable for precooked foods such as breads or rolls, where only reheating is desired.

EXAMPLE I

Histidine was encapsulated in the aqueous phase of liposomes for use in a browning composition. The liposomes were prepared by dissolving 0.997 g of histidine in 25 ml of water. The histidine solution had a pH of 3.8. The pH of this solution was raised to pH 6.9 by the addition of 4 ml of 1 N NaOH. The phospholipid solution was prepared by dissolving 1.875 g of phosphatidylcholine in 50 ml of chloroform. A 12.5 ml aliquot of the histidine solution was combined with 25.4 mg of glycerol and 38 ml of the lipid solution. The mixture was sonicated in a bath-type sonicator for 5 minutes to produce the liposome dispersion. The liposome dispersion was placed in a rotary evaporator at about 60° C. for 30 minutes to remove the solvents. Residual chloroform was removed by purging with nitrogen. The liposomes were then washed with a saline solution and centrifuged, resulting in a liposome gel. The resulting liposomes exhibited about 23 percent encapsulation efficiency of histidine. Examination under a microscope showed good vesicle formation. The liposome gel contained about 10% encapsulated histidine by weight.

EXAMPLE II

Lysine was encapsulated in the aqueous phase of liposomes in a manner similar to that of Example I. The liposome preparation was made by dissolving 1.00 g of lysine in 20 ml of water. The solution had a pH of 9.3, which was buffered to pH 9.5 with 3.0 ml of 1N sodium hydroxide. A phospholipid solution was prepared by dissolving 3.75 g of phosphatidylcholine in 100 ml of chloroform. A 25 ml aliquot of the lysine solution was combined with 75 ml of the phosphatidylcholine solution and 43.6 mg of glycerol. The liposomes were formed by sonicating the mixture for 5 minutes to form a dispersion. The dispersion was placed in a rotary evaporator at about 60° C. to remove the solvents. Residual chloroform was removed by purging with nitrogen. The liposome dispersion was washed with saline and centrifuged to remove any unencapsulated lysine. The resulting liposomes contained about 7% by weight lysine.

EXAMPLE III

This Example demonstrates the preparation of another embodiment of the liposomes used in the encapsulated Maillard browning system. L-lysine (mono hydrochloride salt), in the amount of 1 gram, was dissolved in 33 ml of water containing 0.04 grams of glycerol. The pH of the solution was 9.3. Sodium hydroxide, 1N, was added to the solution, such that the pH was adjusted to 1 pH unit above the pKa of the alpha amino group. Final pH was 9.5. The aqueous solution prepared above was brought to 65° C., a temperature just above the phase transition temperature of the phospholipid to be used in the formation of the vesicle membrane bilayer. The phospholipid was a phosphatidylcholine sold under the name of Phospholipon 100H. Three grams of the phospholipid were added to the aqueous solution at 65° C. The suspension was allowed to stir for eighteen hours at 65° C. At the end of eighteen hours, the liposomes so formed were allowed to cool to room temperature. Liposome vesicles thus formed were examined by light microscopy and found to range in size from 4 to 24 microns in diameter. They were also found to show "form" birefringence under polarized light, consistent with the presence of a condensed, ordered crystalline state. Liposome vesicles were separated from the bulk aqueous phase by centrifugation to form a liposome gel. The amount of lysine encapsulated was 28 mg/g of wet liposome. This corresponds to an encapsulation efficiency of 59% and a total lysine content of 3% by weight based on the total weight of the liposome gel.

EXAMPLE IV

A chitosan browning composition was prepared by dissolving 1 g of chitosan in 100 ml of water containing 10 ml of 0.045 M acetic acid and 0.9 g of NaCl. The pH of the solution was adjusted to 4.5 with a few drops of 1N NaOH. Chitosan has a pKa of about 5.9. To the chitosan solution was added 3.6 g of glucose to give a final concentration by weight of: 1% chitosan, 0.9% saline, 3.6% glucose in acetate buffer solution (pH=4.5), where the percentages are based on the total weight of the aqueous solution. A histidine-containing liposome preparation was prepared according to Example I and 5 ml of this preparation was added to 5 ml of the above chitosan solution. The resulting browning composition had a pH of 4.5. Chitosan has been found to require a pH of about 6 in order to react quickly with glucose to form the brown pigments at the temperatures that are normally obtained in the microwave. The composition was cast into a film having a thickness of about 1 mm. The film was dried to a moisture content of about 20% by weight and subjected to microwave heating for 1 minute. After about 1 minute of microwave heating, the film produced a brown color similar to the natural Maillard browning color, and the film had a pH of about 6.5 to 7.0.

EXAMPLE V

The liposomes of Example III, in the amount of 30 grams (wet weight), containing 0.6 grams of lysine, were combined with 64.0 grams of water, 0.1 gram of sodium carbonate, and 4.0 grams of glucose. This browning composition constitutes another embodiment of the liposome-encapsulated Maillard browning system. This embodiment does not require inclusion of a film-forming component in the heat-activated, liquid browning composition.

EXAMPLE VI

The browning composition of Example IV was brushed onto an uncooked sugar cookie dough blank. The cookie dough contained approximately 51 percent flour, 22 percent sugar, 22 percent shortening, 3.4 percent moisture and 1.4 percent leavening. The browning composition coating was allowed to dry to a moisture content of about 20% by weight or less, and then the coated cookie dough bank was placed in a microwave oven. After about 40 seconds of microwave heating, the cookie developed a brown surface color similar to the surface color of a cookie baked in a standard convection oven.

EXAMPLE VII

The browning composition of Example V was brushed onto an uncooked sugar cookie dough blank. The cookie dough contained approximately 51 percent flour, 22 percent sugar, 22 percent shortening, 3.4 percent moisture and 1.4 percent leavening. The liquid browning composition coating was allowed to dry to a moisture content of about 20% by weight or less, and then the coated cookie dough blank was placed in a microwave oven. After about 40 seconds of microwave heating, the cookie developed a brown surface color similar to the surface color of a cookie baked in a standard convection oven.

EXAMPLE VIII

An encapsulated Maillard browning system was prepared from 1 gram of Amiogum 23 (trademark of a commercially available vegetable gum) dispersed in 99 ml of water along with 10 grams of glucose and 2.8 grams of glycine. The pH of the dispersion was adjusted to pH 8.0 with 0.7 g sodium carbonate. Approximately 23 grams of the liposome dispersion, prepared according to Example II, were added to the dispersion containing the 2.8 g of lysine base. The browning composition had a molar ratio of glucose to encapsulated lysine of 3.5:1. The composition is shelf-stable for extended periods of storage time, until it is subjected to microwave heating. The resulting browning composition may be brushed onto a cookie dough blank or half-product and allowed to dry. The coated cookie dough blank or half-product may then be microwaved for about 40 seconds to produce a brown color.

While certain specific embodiments of the invention have been disclosed herein, it will be readily recognized that various modifications thereof can be made by those skilled in the art. The scope of the invention is not intended to be limited by the described specific embodiments. Any departure from the disclosure, which is within the common practice of those skilled in the art, shall be considered within the scope of the invention and limitations as set forth in the following claims.

What is claimed is:

1. A heat-activated and heat-released browning composition for coating a food product to produce surface browning on exposure to heat or microwave energy, said composition including components comprising:
   (a) at least one amino acid source capable of reacting with a reducing sugar;
   (b) at least one reducing sugar; and
   (c) at least one pH-adjusting agent,
wherein at least one of said components is encapsulated in liposomes to produce a browning composition that is stable at room temperature, provided that the amino acid source and the reducing sugar are not encapsulated in the same liposomes, said liposomes being subject to rupture when exposed to heat or microwave energy, whereby said components encapsulated in said liposomes are released to said composition to promote a chemical browning reaction between said reducing sugar and said amino acid source.

2. The browning composition of claim 1 wherein said pH-adjusting agent and said amino acid source are encapsulated in liposomes, and said reducing sugar is in an external aqueous environment.

3. The browning composition of claim 1 wherein said pH adjusting agent and the reducing sugar are encapsulated in the liposomes and the amino acid source is in an external aqueous environment.

4. The browning composition of claim 1 further comprising at least one film-forming component selected from the group consisting of chitosan, collagen, gelatin, vegetable gums, microcrystalline cellulose, carboxymethylcellulose, hydroxypropylcellulose, polyvinyl pyrrolidone, crosslinked starch, and pregelatinized starch.

5. The browning composition of claim 1 wherein said pH adjusting agent is encapsulated in said liposomes, wherein the pH of the browning composition is below a pH such that said browning composition is substantially inhibited from undergoing the Maillard reaction prior to rupture of said liposomes, and wherein said pH-adjusting agent is able to adjust the pH of said composition upon rupture of said liposomes to promote said browning reaction.

6. The browning composition of claim 1 wherein the amino acid source is selected from the group consisting of histidine, proline, hydroxyproline, methionine, tyrosine, lysine, hydroxylysine, arginine, glycine, alanine, valine, leucine, isoleucine, aspartic acid, glutamic acid, serine, threonine, phenylalanine, primary substituted amines, chitosan, protein hydrolyzate, yeast, yeast autolyzate, and yeast extract.

7. The browning composition of claim 1 wherein the reducing sugar is selected from the group consisting of glucose, maltose, xylose, mannose, galactose, fructose, arabinose, and modified starches.

8. The browning composition of claim 1 wherein the molar ratio of said amino acid source to said reducing sugar is between about 0.5:1 and 1:10.

9. The browning composition of claim 4 further comprising between about 10 percent and about 90 percent amino acid source by weight of the film-forming component.

10. The browning composition of claim 4 further comprising between about 10 percent and about 99 percent reducing sugar by weight of the film-forming component.

11. The browning composition of claim 5 wherein the pH of the composition is below the pKa of the primary amino group of the amino acid source before rupture of the liposomes.

12. The browning composition of claim 11 wherein the pH of the composition is between about 4 and about 10 before rupture of the liposomes.

13. The browning composition of claim 5 comprising an amount of said liposome-encapsulated pH-adjusting agent sufficient to adjust the pH of the browning composition between a value of about pKa +0.2 and about pKa +1, wherein pKa is the pKa of the primary amino group of the amino acid source.

14. The browning composition of claim 1 wherein at least one of said amino acid source and reducing sugar is encapsulated in the liposomes and the pH of the composition is such that the Maillard browning reaction will occur when the liposomes rupture.

15. The browning composition of claim 1 wherein the composition is in the form selected from the group consisting of a liquid, powder, paste, and film.

16. The browning composition of claim 1 wherein said liposomes comprise at least one polar lipid bilayer and at least one aqueous core, the aqueous core having said pH-adjusting agent dispersed therein, and wherein said pH-adjusting agent comprises between about 0.5 percent and 15 percent by total weight of the liposome.

17. The browning composition of claim 1 wherein the pH-adjusting agent is selected from the group consisting of histidine, lysine, hydroxylysine, arginine, sodium carbonate, sodium bicarbonate, and sodium phosphate.

18. The browning composition of claim 16 wherein the polar lipid bilayer comprises at least one substance selected from the group consisting of lecithin, cephalin, dipalmitoylphosphatidylglycerol, distearoylphosphatidyl chlorine, sphingomyelin, phosphatidic acid, phosphatidylserine, phosphatidylinositol, phosphatidylchlorine, phosphatidylethanolamine, cholesterol, dipalmitoyl- phosphatidylcholine, and mixtures thereof.

19. The browning composition of claim 1 wherein said liposomes further contain at least one liposome-encapsulated component selected from the group consisting of flavoring agents, coloring agents, and vitamins.

20. A composite food product comprising an edible substrate material and a surface coating of a browning composition which is stable at room temperature, said browning composition including components comprising;
  (a) at least one amino acid source capable of reacting with a reducing sugar;
  (b) at least one reducing sugar; and
  (c) at least one pH-adjusting agent,
  wherein at least one of said components is encapsulated in liposomes, provided that the amino acid source and the reducing sugar are not encapsulated in the same liposomes, said liposomes being capable of rupturing upon exposure to heat or microwave energy to release the components encapsulated in the liposomes and promote a chemical browning reaction between said reducing sugar and said amino acid source.

21. The composite claim 20 wherein said pH-adjusting agent and the amino acid source are encapsulated in liposomes, and the reducing sugar is in an external aqueous environment.

22. The composite of claim 20 wherein said pH-adjusting agent and the reducing sugar are encapsulated in liposomes, and the amino acid source is in an external aqueous environment.

23. The composite of claim 20 wherein said browning composition further includes at least one film-forming component selected from the group consisting of chitosan, collagen, gelatin, vegetable gums, microcrystalline cellulose, carboxymethylcellulose, hydroxypropylcellulose, polyvinyl pyrrolidone, crosslinked starch, and pregelatinized starch.

24. The composite of claim 20 wherein said browning composition has a pH between about 4 and 6 before said liposomes are ruptured.

25. The composite of claim 20 wherein said pH-adjusting agent is encapsulated in liposomes and is capable of adjusting the pH of said browning composition between a value of about pKa +0.2 and about pKa +1.0, wherein pKa is the value of the pKa of the primary amino group of said amino acid source, and wherein the pH of the composition is sufficiently low to substantially inhibit the browning reaction before rupture of the liposomes.

26. The composite of claim 23 wherein said coating is a substantially continuous film.

27. The composite of claim 20 wherein said coating is disposed in a location on the substrate and in a pattern.

28. The composite of claim 20 wherein said edible substrate is selected from the group consisting of meat and flour-based dough product.

29. The composite of claim 28 wherein said flour-based dough product is selected from the group consisting of cookie, cracker, biscuit, cake, pie crust, bread, roll, muffin, and brownie.

30. The composite of claim 20 wherein at least one of said amino acid source and reducing sugar is encapsulated in said liposomes, and wherein the pH of the composition is such that it promotes the browning reaction upon rupture of the liposomes.

31. The composite of claim 20 wherein said edible substrate is partially cooked.

32. The composite of claim 20 wherein the amino acid source is selected from the group consisting of histidine, proline, hydroxyproline, methionine, tyrosine, lysine, hydroxylysine arginine, glycine, alanine, valine, leucine, isoleucine, aspartic acid, glutamic acid, serine, threonine, phenylalanine, a primary substituted amine, chitosan, protein hydrolyzate, yeast, yeast autolysate, or yeast extract.

33. The composite of claim 20 wherein the reducing sugar is selected from the group consisting of glucose, maltose, xylose, mannose, galactose, fructose, arabinose, and modified starches.

34. The composite of claim 20 wherein the molar ratio of the amino acid source to said reducing sugar is between about 0.5:1 and 1:10.

35. The composite of claim 23 further comprising between about 10 percent and 90 percent amino acid source by weight of the film-forming component.

36. The composite of claim 23 further comprising between about 15 percent and 90 percent reducing sugar by weight of the film-forming component.

37. The composite of claim 21 wherein the pH-adjusting agent comprises between about 0.5 percent and 15 percent by weight based on the total weight of the liposome.

38. The composite of claim 20 wherein the pH-adjusting agent comprises at least one base selected from the group consisting of histidine, lysine, hydroxylysine, arginine, sodium carbonate, sodium bicarbonate, and sodium phosphate.

39. A microwave browning composition comprising;
(d) chitosan;
(e) at least one reducing sugar; and
(f) at least one pH-adjusting agent,
wherein at least one of said reducing sugar and pH-adjusting agent is encapsulated in the aqueous core of liposomes, said liposomes being capable of rupturing during heating to promote a browning reaction between the reducing sugar and the chitosan.

40. The browning composition of claim 39 wherein said pH-adjusting agent is encapsulated, and said composition has a pH between about 4.0 and about 6.0 before the substantial rupture of said liposomes, whereby said browning reaction is substantially inhibited.

41. The browning composition of claim 39 wherein the pH-adjusting agent is a liposome-encapsulated base and is present in an amount effective to adjust the pH of the composition to between about 6.2 and about 7.2 upon rupture of the liposomes to promote said browning reaction.

42. The browning composition of claim 39 comprising about 10 to 99 percent by weight reducing sugar based on the weight of the chitosan.

43. The browning composition of claim 39 wherein the pH-adjusting agent is histidine, glycine, lysine, arginine, sodium bicarbonate, sodium carbonate, sodium phosphate, or mixtures thereof.

44. The browning composition of claim 39 wherein the reducing sugar is selected from the group consisting of glucose, maltose, xylose, mannose, galactose, fructose, arabinose, and modified starches.

45. A method of treating a food product to render the surface thereof subject to browning on exposure to microwave energy, said method comprising the step of;
coating the surface of a food product with a microwave-activated browning composition, wherein the browning composition includes components comprising at least one amino acid source, at least one reducing sugar, and at least one pH-adjusting agent,
wherein at least one of said components is encapsulated in liposomes, provided that the amino acid source and the reducing sugar are not encapsulated in the same liposomes, said liposomes being capable of rupturing upon exposure to heat or microwave energy to release said component encapsulated in the liposomes and to promote a chemical browning reaction between said amino acid source and said reducing sugar.

46. The method of claim 45 wherein said browning composition is applied as a solution to the food product by spraying, brushing, dipping or rolling.

47. The method of claim 45 wherein said browning composition further includes at least one film-forming component selected from the group consisting of chitosan, collagen, gelatin, vegetable gums, microcrystalline cellulose, carboxymethylcellulose, hydroxypropylcellulose, polyvinyl pyrrolidone, crosslinked starch, and pregelatinized starch.

48. The method of claim 47 wherein the browning composition is applied as a substantially continuous film.

49. The method of claim 47 wherein the browning composition is applied as a coating about 1 mm thick.

50. The method of claim 45 comprising the step of partially cooking said food product prior to the coating step.

51. The method of claim 45 wherein the amino acid source is selected from the group consisting of histidine, proline, hydroxyproline, methionine, tyrosine, lysine, hydroxylysine, arginine, glycine, alanine, valine, leucine, isoleucine, aspartic acid, glutamic acid, serine, threonine, phenylalanine, a primary substituted amine, protein hydrolyzate, yeast, yeast autolysate, chitosan, or yeast extract.

52. The method of claim 45 wherein said reducing sugar is glucose, maltose, xylose, mannose, galactose, fructose, arabinose or modified starch.

53. A method of surface browning a food product in a microwave oven, comprising the steps of;
(a) coating the surface of a food product with a browning composition, wherein the browning composition includes components comprising at least one amino acid source, a reducing sugar, and at least one pH-adjusting agent, wherein at least one of said components is encapsulated in liposomes, provided that said amino acid source and said reducing sugar are not encapsulated in the same liposomes, said liposomes being subject to rupture upon exposure to microwave energy, such that a chemical browning reaction can occur on exposure to microwave energy; and
(b) subjecting said coated food product to microwave energy for a time sufficient to rupture said liposomes and promote a chemical browning reaction.

54. The method of claim 53 wherein said browning composition further includes at least one film-forming component selected from the group consisting of chitosan, collagen, gelatin; vegetable gums, microcrystalline cellulose, carboxymethylcellulose, hydroxypropylcellulose, polyvinyl pyrrolidone, crosslinked starch, and pregelatinized starch.

55. The method of claim 53 wherein said pH-adjusting is encapsulated in liposomes, and said pH-adjusting agent is selected from the group consisting of histidine, lysine, hydroxylysine, arginine, and mixtures thereof, and wherein the pH of the composition is sufficiently low before substantial rupture of the liposomes such that the chemical browning reaction is substantially inhibited.

56. A heat-activated browning composition comprising reactants including,
a) at least one amino acid source capable of reacting with a reducing sugar,
b) at least one reducing sugar, wherein at least one of said reactants is liposome-encapsulated, provided that said amino acid source and said reducing sugar are not encapsulated in the same liposomes, and the liposomes are subject to rupture on exposure to sufficient heat, whereby the encapsulated reactant is released to said composition to promote a chemical browning reaction between said reducing sugar and amino acid source.

57. The heat-activated browning composition of claim 56 wherein said at least one amino acid source is liposome-encapsulated.

58. The heat-activated browning composition of claim 56 wherein said amino acid source is selected from the group consisting of histidine, proline, hydroxyproline, methionine, tyrosine, lysine, arginine, glycine, alanine, valine, leucine, isoleucine, aspartic acid, glutamic acid, serine, threonine, phenylalanine, a primary substituted amine, chitosan, protein hydrolyzate, yeast, yeast autolyzate, and yeast extracts.

59. The heat-activated browning composition of claim 56 wherein said reducing sugar is liposome-encapsulated.

60. The heat-activated browning composition of claim 56 wherein said reducing sugar is glucose, maltose, xylose, mannose, galactose, fructose, arabinose, or modified starches.

61. The heat-activated browning composition of claim 56 wherein the encapsulated reactant is a basic amino acid consisting of lysine, hydroxylysine, histidine, or arginine.

62. The heat-activated browning composition of claim 56 wherein said composition is adjusted to a pH of about 4 to about 10 prior to rupture of the liposomes.

63. The heat-activated browning composition of claim 56 wherein said browning composition further includes at least one film-forming component selected from the group consisting of chitosan, collagen, gelatin, vegetable gums, microcrystalline cellulose, carboxymethylcellulose, hydroxypropylcellulose, polyvinyl pyrrolidone, crosslinked starch, and pregelatinized starch.

64. The heat-activated browning composition of claim 56 further comprising at least one pH-adjusting agent.

65. The heat-activated browning composition of claim 64 wherein said pH-adjusting agent is encapsulated within liposomes, and wherein the pH of the browning composition is a value less than pKa +0.2, where pKa is the pKa of the amino acid source, prior to rupturing of the liposomes, such that the browning reaction is substantially inhibited.

* * * * *